Nov. 15, 1960     M. W. UITVLUGT     2,959,843
METHOD OF PRODUCING TURBINE BLADES
Filed Jan. 17, 1955

FIG. 2C / FIG. 2A

INVENTOR.
MARTIN W. UITVLUGT
BY
ATTORNEYS

United States Patent Office 2,959,843
Patented Nov. 15, 1960

2,959,843
METHOD OF PRODUCING TURBINE BLADES

Martin W. Uitvlugt, Battle Creek, Mich., assignor to Eaton Manufacturing Company, Cleveland, Ohio, a corporation of Ohio Filed Jan. 17, 1955, Ser. No. 482,043

7 Claims. (Cl. 29—156.8)

This invention relates to turbine blades and more particularly to a method of manufacturing turbine blades from stock material.

Broadly, the present invention comprehends a sequence of manipulations or operations performed on a piece of stock material, each concerning a thermal condition of the blade, to facilitate a physical change in the material to enable formation of a turbine blade with the proper section, pitch and taper.

Since it has been ascertained that certain titanium alloys are particularly adaptable for turbine blades as possessing certain desirable properties and since standard methods of processing stainless steel and other materials for turbine blades are not suitably adapted for processing the titanium alloys, this invention is particularly concerned with improved processing of titanium alloys for forming turbine blades.

It is an object of the present invention to provide a method of forming turbine blades overcoming the defects of prior art methods.

It is another object of the present invention to provide a method of manipulating stock material to provide a turbine blade that is smooth, even, and has a desirably small grain structure.

It is another object of the present invention to provide a method of forming a turbine blade that minimizes the formation of scale on the turbine blade surface.

A further object of the invention is to provide a method of forming turbine blades made from titanium alloys or the like that eliminates blade cracking or die scoring.

Figure 1A:
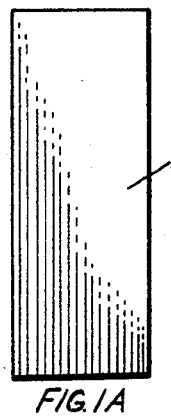
Figure 1B:

Figs. 1A and 1B show two views of a bar of stock material of which turbine blades are formed.

Figure 2B:
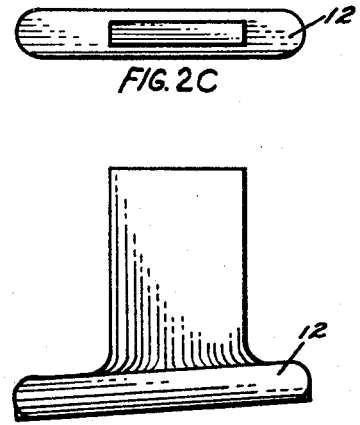

Figs. 2A, 2B, and 2C are three views of the bar after the first step in forming the blade.

Figure 3C:
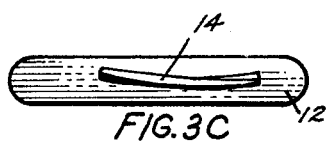
Figure 3A:
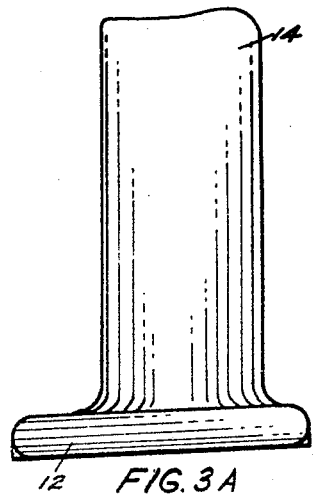
Figure 3B:
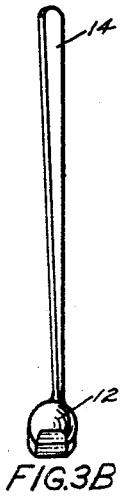

Figs. 3A, 3B, and 3C are three views of the bar after the second step in forming the blade.

Figure 4C:
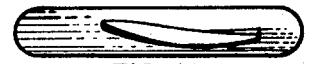
Figure 4A:
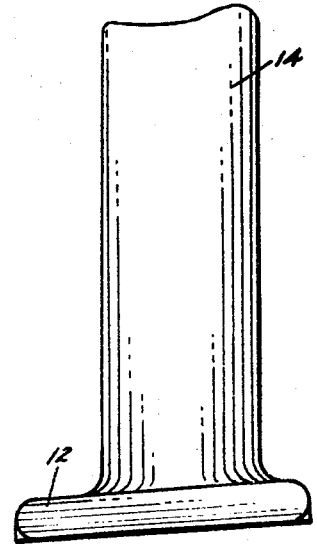
Figure 4B:
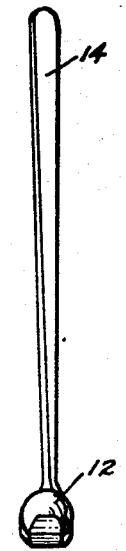

Figs. 4A, 4B, and 4C are three views of the completed blade and following an optional third step in blade formation.

The standard process of forming turbine blades, commonly termed the gather and roll process, which consists in gathering and upsetting rectangular bar stock to provide sufficient stock to form a blade root followed by two hot rolling operations, an anneal and a cold rolling operation performed at temperatures employed for steels, has been found unsatisfactory for the processing of titanium alloys since in employing this process numerous forging laps are formed on the blade surface, the grain size of the metal is unduly large causing brittleness, grooves are cut into the dies and the blades are cracked along leading and trailing edges. Also, machining of the fillet area is required after the gather or upsetting operation. It has been ascertained that the defects are due primarily to the elevated temperatures employed in the processing of standard materials, and it has also been ascertained that the proper heating ranges and the proper heating pattern resulting in cases of induction heating from reduced frequencies, produces good forgings without laps and other mentioned defects and with the desirable small grain size. Reduction of the speed of the upsetter ram to 75% of the standard speed employed for steels is a contributing factor in the elimination of forging laps and if heating for the forge rolling operation on blades is preformed in an oxidizing atmosphere of a gas-fired rotary furnace, surface scaling of the blade is reduced to a minimum.

In the processing a blade according to the present invention, the gather and roll technique is employed but the roll dies are changed so as to include a root pocket as well as an airfoil shaping section so as to roll over and shape the root. This produces the fillet and root areas simultaneously with rolling of the airfoil section, giving better blend and lean conditions resulting in a blade with desirable grain flow lines to impart strength and durability thereto.

The actual rolling process is a very desirable way of forming blades. In the rolling or kneading action between the dies, the metal is moved primarily in one direction, viz, parallel to the axis of the blade and the grain flow of the original bar giving ideal grain flow in the finished blade. Direction metal movement also reduces flash to a minimum and also reduces scrap. The dies contact only a small portion of the blade at any one time, permitting a very high unit pressure for metal displacement but holding the total forging or machine pressure to a low value. Direction movement plus low pressure gives very good die life and permits movement or forging of metals which would be very difficult to forge by drop hammering or press forging. A number of alloys having various amounts of constituent elements may be employed in the present invention to provide various desired properties in the blade. The following table lists several titanium alloys found suitable in the present process and also includes the quantities of various constituents of the alloy.

Figure 2B:
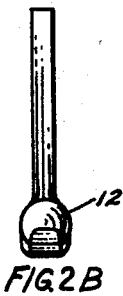

Table I (1) Ti-75A:
  Iron .20% maximum
  Nitrogen .10% maximum
  Oxygen trace
  Carbon .07%
  Tungsten .02%
  Titanium remainder (2) Ti-140A:
  Iron 2.0%
  Chromium 2.0%
  Molybdenum 2.0%
  Carbon .07% maximum
  Tungsten .02% maximum
  Silicon .03%
  Oxygen .20% maximum
  Nitrogen .10% maximum
  Hydrogen .04%
  Titanium remainder (3) Ti-150A:
  Chromium 2.7%
  Iron 1.5%
  Oxygen .35% maximum
  Nitrogen .10% maximum
  Tungsten .02% maximum
  Carbon .07% maximum
  Titanium remainder (4) A-110AT:
  Aluminum 5.0%
  Tin 2.5%
  Titanium remainder (5) C-130AM:
  Aluminum 4.0%
  Manganese 4.0%
  Titanium remainder (6) CF-217:
  Aluminum 6.0%
  Vanadium 4.0%
  Titanium remainder In processing turbine blades according to the present invention, a bar or blank of stock material of rectangular cross section is preferably heated to a temperature within the range 700° F. to 800° F. and sheared to the proper length to provide a bar 10 shown in the two views of Fig. 1, it being understood, however, that the blade blank may be cut to length by any suitable means including sawing. The bar 10 is cooled and ground to smaller tolerances in a suitable manner as, for example, by an opposed wheel disc grinder employing sodium nitrite and water coolant. The bar is next heated in any suitable manner in preparation for the root gathering or upsetting operation. For quantity production, a standard induction heater with an oscillatory circuit designed to operate at a frequency above approximately 10 kilocycles per second is found suitable and for sample quantities, a gas fired liquid pot may be used. The ideal range of temperatures at which the root gathering operation takes place varies according to the particular composition of the alloy. The ranges employed for the alloys in Table I extend 300° F. from 1300° F.–1600° F. to 1400° F.–1700° F. The root gathering or upsetting operation is preferably performed on a standard upset machine and normally two blows suffice to gather sufficient stock to form a root 12 as shown in the three views of Fig. 2 of the drawings, it being understood that the number of operations required would vary with the size and complexity of the root.

After the gathering step is performed, the scale is removed from the bar by a suitable descaling process. Among the processes found suitable are the caustic descaling methods wherein the bar is dipped into sodium hydride solution, Virgo salts, an acid descale consisting of 2 per centum hydrofluoric acid and 20 per centum nitric acid or any other suitable caustic material or a mechanical descaling method such as grit blast, shot blast, vapor blast or hydro blast may be employed.

The bar is next prepared for the rolling operations for forming and shaping the same and is heated in preferably an electric air atmosphere furnace or a rotary gas-fired furnace with a slightly oxidizing atmosphere to a temperature within a suitable range of temperatures which depends upon the particular composition of the alloy considered. Any heating means other than that mentioned may, of course, be employed. The roll form operation is performed with a machine as shown in United States Patent No. 2,654,277 to Oscar Hedlund and assigned to the same assignee as the present invention. The dies of the machine are designed to permit rolling over the upset root and airfoil, thus securing a positive root blend and airfoil relationship as above noted. The rolling operation is performed as many times as is found necessary, depending, of course, on blade sizes, to produce a blade having a root section 12 and an airfoil 14 as shown in the three views of Fig. 3 of the drawings. Ordinarily three to six rolling operations are sufficient. Following each roll, a descaling operation as above described is performed on the blade and following each roll forging operation, an immediate post roll stress relief of approximately five minutes duration at 1200° F. to 1300° F. may be performed. At this stage of the development of the blade, it is rough trimmed to remove the excessive flash that may interfere with further operations to be performed on the blade.

Following the trimming operation, the blade may be cold rolled in one or more passes to put the outer fibers of the blade in compression and give the blades very good fatigue strength and stress corrosion properties to produce a blade as shown in the three views of Fig. 4 of the drawings. Normally, however, the final rolling temperatures would be that of the form roll step although a final roll at between 600° F. to 1000° F. may be performed as a final roll.

As a final step in the forging operations, the blades are trimmed to width from either forged or machined locators. A dovetail is machined into the root section by milling and/or broaching, and the airfoil edges and surface are finished by belt polishing and buffing.

The following table lists in columns 2 and 3 the preferable and in columns 4 and 5 the suitable temperature ranges for the upset and form roll operations for the six titanium alloys above described.

Table II

| Alloy | Upset | Form Roll | Upset | Form Roll |
| --- | --- | --- | --- | --- |
| Ti–75A | 1400–1500° F. | 1350–1450° F. | 1300–1600° F. | 1200–1600° F. |
| Ti–140A | 1450–1550° F. | 1350–1450° F. | 1300–1600° F. | 1200–1600° F. |
| Ti–150A | 1450–1550° F. | 1350–1450° F. | 1300–1600° F. | 1200–1600° F. |
| A–110AT | 1550–1650° F. | 1600–1700° F. | 1400–1700° F. | 1400–1800° F. |
| C–130AM | 1450–1550° F. | 1450–1550° F. | 1350–1650° F. | 1300–1700° F. |
| CF–217 | 1450–1550° F. | 1500–1600° F. | 1400–1700° F. | 1400–1800° F. |

It is to be noted from the foregoing description that the titanium alloys involved vary considerably as to the respective components thereof and as to the proportions of the various components but that in the blade formation the overall range of upsetting is from 1400–1650° F. and that the overall range of form rolling is from 1350–1700° F.

It is to be understood that the foregoing description of the method of forming turbine blades and the specific values of alloy compositions and temperature ranges employed are exemplary only and not to be construed in a limiting sense, the scope and spirit of the invention to be determined by the appending claims.

What I claim is:

1. A method of forming a titanium alloy turbine blade having a root section and an airfoil section comprising the steps of shearing a bar of titanium alloy, comprising at least 90% titanium, a maximum of 6% aluminum and the remaining percent taken from one of the group of tin, manganese or vanadium comprising at least 90% titanium stock material to length, descaling said bar, heating said bar to a temperature in the range 1500° F. to 1600° F. and upsetting said bar at one end at said last mentioned temperature to form a blade root at said end, descaling said upset bar, heating said bar to a temperature in the range 1500° F. to 1650° F. and roll forging said bar at said section removed from said root section to form an airfoil section and simultaneously roll forging the region at the juncture of said sections to complete the formation of said blade and removing the scale from said blade.

2. A method of forming a titanium alloy turbine blade having a root section and an airfoil section comprising the steps of removing the scale from a bar of titanium alloy comprising at least 90% titanium, at least 4% aluminum and including 4% manganese stock material, heating said bar to a temperature in the range 1450° F. to 1550° F. and upsetting one end of said bar forming a root section thereat, removing the scale from said bar, heating said bar to a temperature in the range of 1450° F. to 1550° F. and roll forging said bar removed from said root section forming an airfoil section and a juncture region between said root and airfoil sections and removing the scale from said section to complete the formation of said blade.

3. A method of forming a titanium alloy turbine blade having a root section and an airfoil section comprising the steps of heating a bar of titanium alloy comprising at least 90% titanium and aluminum between the ranges of 4 to 6% with the remaining percent including one of the group of tin, manganese or vanadium stock material to a temperature within the range 1500° F. to 1600° F. and upsetting one end of said bar at said temperature to form a root section, descaling said bar, heating said bar to a temperature within the range 1500° F. to 1650° F. and roll forging said bar along said portion removed from said root section to form an airfoil section of a blade and descaling said blade to complete the formation thereof.

4. A method of forming a titanium alloy turbine blade having a root section and an airfoil section comprising the steps of heating a bar of titanium alloy comprising at least 90% titanium and aluminum between the ranges of 4 to 6% with the remaining percent taken from one of the group of tin, manganese or vanadium stock material with an induction heater operating at above 10 kilocycles to a temperature within the range 1450° F. to 1600° F. and upsetting one end of said bar at said temperature to form a root section for a turbine blade, descaling said bar by bathing in a caustic bath, heating said bar to a temperature within the range 1500° F. to 1650° F. and roll forging the portion of said bar removed from said root section to form an airfoil section of said blade, descaling said blade by bathing in a caustic bath to complete the formation of said blade.

5. A method of forming a titanium alloy turbine blade having a root section and an airfoil section comprising the steps of heating a bar of titanium alloy comprising at least 90% titanium, aluminum between the ranges of 4 to 6% with the remaining percent including one of the group of tin, manganese or vanadium stock material to a temperature within the range 1500° F. to 1600° F., upsetting one end of said bar at said temperature to form a root section at said end, descaling said bar, heating said bar to a temperature within the range 1500° F. to 1600° F., roll forming said bar at said last mentioned temperature to form an airfoil section at the portion removed from said root, and further roll forming said blade at a temperature lower than the temperatures of said last mentioned range.

6. A method of forming a titanium alloy turbine blade according to claim 5 wherein said further roll forming is performed at a temperature in the range 600° F. to 1000° F.

7. A method of forming a titanium alloy turbine blade according to claim 5 wherein said further roll forming is performed at a temperature in the range of normal atmospheric temperatures.

References Cited in the file of this patent

UNITED STATES PATENTS

| | | |
|---|---|---|
| 1,420,278 | Parsons | June 20, 1922 |
| 2,254,629 | Stine | Sept. 2, 1941 |
| 2,638,663 | Bartlett | May 19, 1953 |

FOREIGN PATENTS

| | | |
|---|---|---|
| 1,072,391 | France | Sept. 13, 1954 |

OTHER REFERENCES

Journal of Metals published American Institute of Mining and Metallurgical Engineers 29 W. 39th St., New York, N.Y. March 1950. "Titanium Binary Alloys" pp. 485–497. Alternate Citation Transactions AIME, vol. 188.

"Titanium Metal and Its Future," by Richard M. Burston et al., published March 3, 1952, TN 799 T5, B8, C3, pp. 31–33.

Handbook on Titanium by Heinrich K. Adenstedt, TN 799.T5 A3 h P.T. 1 WADC Report 54 305 published August 1954, Wright Air Development Center, pp. (I–3–3 to I–3–27).

UNITED STATES PATENT OFFICE
CERTIFICATION OF CORRECTION

Patent No. 2,959,843                  November 15, 1960

Martin W. Uitvlugt

It is hereby certified that error appears in the above numbered patent requiring correction and that the said Letters Patent should read as corrected below.

Column 4, lines 18 and 19, strike out "comprising at least 90% titanium".

Signed and sealed this 2nd day of May 1961.

(SEAL)
Attest:

ERNEST W. SWIDER
Attesting Officer

DAVID L. LADD
Commissioner of Patents